United States Patent
Fujiki (10) Patent No.: US 9,452,747 B2
(45) Date of Patent: Sep. 27, 2016

(54) VEHICLE BRAKING CONTROL DEVICE

(71) Applicant: Nissan Motor Co., Ltd., Yokohama-shi, Kanagawa (JP)

(72) Inventor: Noriaki Fujiki, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 318 days.

(21) Appl. No.: 14/374,571

(22) PCT Filed: Mar. 1, 2013

(86) PCT No.: PCT/JP2013/055715
§ 371 (c)(1),
(2) Date: Jul. 25, 2014

(87) PCT Pub. No.: WO2013/133176
PCT Pub. Date: Sep. 12, 2013

(65) Prior Publication Data
US 2015/0035352 A1 Feb. 5, 2015

(30) Foreign Application Priority Data
Mar. 5, 2012 (JP) .................................. 2012-047798

(51) Int. Cl.
| | | |
|---|---|---|
| *B60T 13/00* | (2006.01) | |
| *B60T 13/66* | (2006.01) | |
| *B60T 7/04* | (2006.01) | |
| *B60T 13/02* | (2006.01) | |
| *B60T 13/74* | (2006.01) | |

(52) U.S. Cl.
CPC ................ *B60T 13/66* (2013.01); *B60T 7/042* (2013.01); *B60T 13/662* (2013.01); *B60T 13/745* (2013.01); *B60T 13/02* (2013.01); *B60T 13/74* (2013.01); *B60T 2270/82* (2013.01)

(58) Field of Classification Search
CPC ...... B60T 13/02; B60T 13/74; B60T 13/746; B60T 13/66; B60T 13/662; B60T 13/745; B60T 7/042
See application file for complete search history.

(56) References Cited

U.S. PATENT DOCUMENTS

| | | | | |
|---|---|---|---|---|
| 2009/0115242 A1* | 5/2009 | Ohtani | .................... | B60T 7/042 303/3 |
| 2011/0077831 A1* | 3/2011 | Nishino | .................. | B60T 7/042 701/70 |
| 2014/0095044 A1* | 4/2014 | Kikawa | ................. | B60T 17/221 701/70 |

FOREIGN PATENT DOCUMENTS

| | | |
|---|---|---|
| JP | 2002-104151 A | 4/2002 |
| JP | 2007-296963 A | 11/2007 |
| JP | 2010-195170 A | 9/2010 |
| JP | 4784756 B2 | 7/2011 |

* cited by examiner

*Primary Examiner* — Nicholas J Lane
(74) *Attorney, Agent, or Firm* — Global IP Counselors, LLP (57) ABSTRACT

A vehicle braking control device includes a control unit that, when a characteristic representing the relationship between an estimated amount of fluid consumed by braking, which is estimated based on the amount a brake pedal is operated, and an actual master-cylinder pressure detected by a master-cylinder pressure detection unit is different from that of a preset characteristic in a reference map indicating representing the relationship between the amount of fluid consumed by braking and the master cylinder pressure, corrects a target value of a degree of relative displacement between an input member and an assist member by a target relative displacement-amount correction unit in a direction in which the difference between characteristics is reduced.

14 Claims, 8 Drawing Sheets

VEHICLE BRAKING CONTROL DEVICE

CROSS-REFERENCE TO RELATED APPLICATIONS

This application is a U.S. National stage application of International Application No. PCT/JP2013/055715, filed Mar. 1, 2013, which claims priority to Japanese Patent Application No. 2012-047798 filed in Japan on Mar. 5, 2012, the contents of each of which are hereby incorporated herein by reference.

BACKGROUND

1. Field of the Invention

The present invention relates to a vehicle braking control device that generates force-multiplied brake hydraulic pressure in a master cylinder by an assist thrust imparted to an assist member in response to a movement of an input member.

2. Background Information

A conventional vehicle braking control device is known that uses an electric actuator to move an assist member in forward and backward directions, and multiplies the force to output a brake pedal input from a master cylinder (for example, see Patent JP 4784756 Publication). With this vehicle braking control device, controlling the electric actuator makes it possible to vary the relative displacement between the input member that moves in the forward and backward directions by operating the brake pedal, and the assist member that moves relative to the input member, resulting in a desired braking characteristic.

SUMMARY

However, with the conventional vehicle braking control device, when varying the relative displacement of the input member and the assist member, the master-cylinder pressure generated by operating the brake pedal is not directly monitored.

In other words, a target degree of relative displacement is set based on an operating amount of the brake pedal, and the electric actuator is controlled so that the relationship of the degree of relative displacement between the input member and the assist member is at the target displacement amount, based on the degree of relative displacement or a displacement amount of the assist member.

In contrast, a characteristic representing the relationship between the brake fluid amount (hereinafter referred to as amount of fluid consumed by braking) that is supplied to a brake caliper in response to movement in the forward and backward directions of the input member and the assist member, and the master-cylinder pressure varies according to the resupply of brake fluid during a braking operation. In such a case, even if the operating amount of the brake pedal is the same, the master cylinder outputted from the master cylinder can be different.

For that reason, there is a problem in that braking (generated braking force) and the feeling of the pedal will vary relative to preset assumptions, if the electric actuator is controlled based on the degree of relative displacement between the input member and the assist member or the displacement amount of the assist member. Also, if the braking effectiveness and the brake feeling vary, the driver may experience an unpleasant feeling.

In view of the aforementioned problem, an object of the present invention is to provide a vehicle braking control device that controls braking and the feeling of the brake even if the relationship characteristics of the amount of fluid consumed by braking and the master-cylinder pressure vary.

In order to attain the aforementioned object, this vehicle braking control device is equipped with an input member, an assist member, a force-multiplying actuator, and a control means, a force-multiplied hydraulic brake pressure being generated in a master cylinder by an assist thrust imparted to the assist member in response to a movement of the input member, wherein the vehicle braking control device further comprises a reference map, an amount-of-fluid-consumed-in-braking-estimating means, and a master-cylinder pressure detection means.

The input member is moved forward and backward by operation of the brake pedal.

The assist member is disposed to be capable of moving in a relative manner with respect to a direction of movement of the input member.

The force-multiplying actuator moves the assist member forward and backward, and varies the degree of relative displacement between the input member and the assist member.

The reference map is preset with the characteristic representing the relationship between the amount of fluid consumed by braking and the master-cylinder pressure.

The amount-of-fluid-consumed-in-braking-estimating means calculates an estimated amount of fluid consumed by braking, which is the amount of fluid consumed in braking for implementing a braking force based on the brake pedal operating amount.

The master-cylinder pressure-detection means detects the actual master-cylinder pressure.

Also, the control means, when the characteristic representing the relationship between the estimated amount of fluid consumed by braking and the actual master-cylinder pressure has a difference with regard to the reference map, sets a target value for the degree of relative displacement between the input member and the assist member based on the operating amount of the brake pedal, and corrects the degree of relative displacement between the input member and the assist member toward a direction to reduce characteristics differences, when controlling the force-multiplying actuator so that the degree of relative displacement matches the target value.

In this vehicle braking control device, when the characteristic representing the relationship between the estimated amount of fluid consumed by braking and the actual master-cylinder pressure has a characteristics difference with regard to the reference map, the target value of the degree of relative displacement between the input member and the assist member is corrected by the control means in a direction in which the characteristics difference is reduced.

In other words, this monitors the actual master-cylinder pressure; when the characteristic representing the relationship between the amount of fluid consumed by braking and the master-cylinder pressure varies because of the resupply, or the like, of the brake fluid amount while the brake is being operated, the target value of the relative displacement is corrected so that the relationship characteristic is aligned to the preset reference map.

Also, by correcting the target value of the degree of relative displacement, the actual master-cylinder pressure becomes an ideal master-cylinder pressure (a reference master-cylinder pressure) with regard to the operating amount of the brake pedal, thereby controlling to vary the braking and pedal feel with regard to the assumption. This results in reducing an unpleasant sensation for the driver.

BRIEF DESCRIPTION OF THE DRAWINGS

Referring now to the attached drawings which form a part of this original disclosure.

FIG. 1 is an overall structural view of a braking device in the vehicle braking control device of Embodiment 1.

FIG. 7 is a map showing one example of a characteristic representing a relationship between a brake pedal depressing force and a braking force, when the actual master-cylinder pressure is high.

DETAILED DESCRIPTION OF EMBODIMENTS

Modes for carrying out the vehicle braking control device of the present invention will now be described based on Embodiments 1 and 2 depicted in the drawings.

Embodiment 1

First, a configuration of the vehicle braking control device according to Embodiment 1 will now be described focusing on a basic configuration of an electric vehicle, a configuration of a braking device, a configuration of a control system, and a configuration for calculating a target displacement correction amount.

Basic Configuration of an Electric Vehicle

Figure 1:
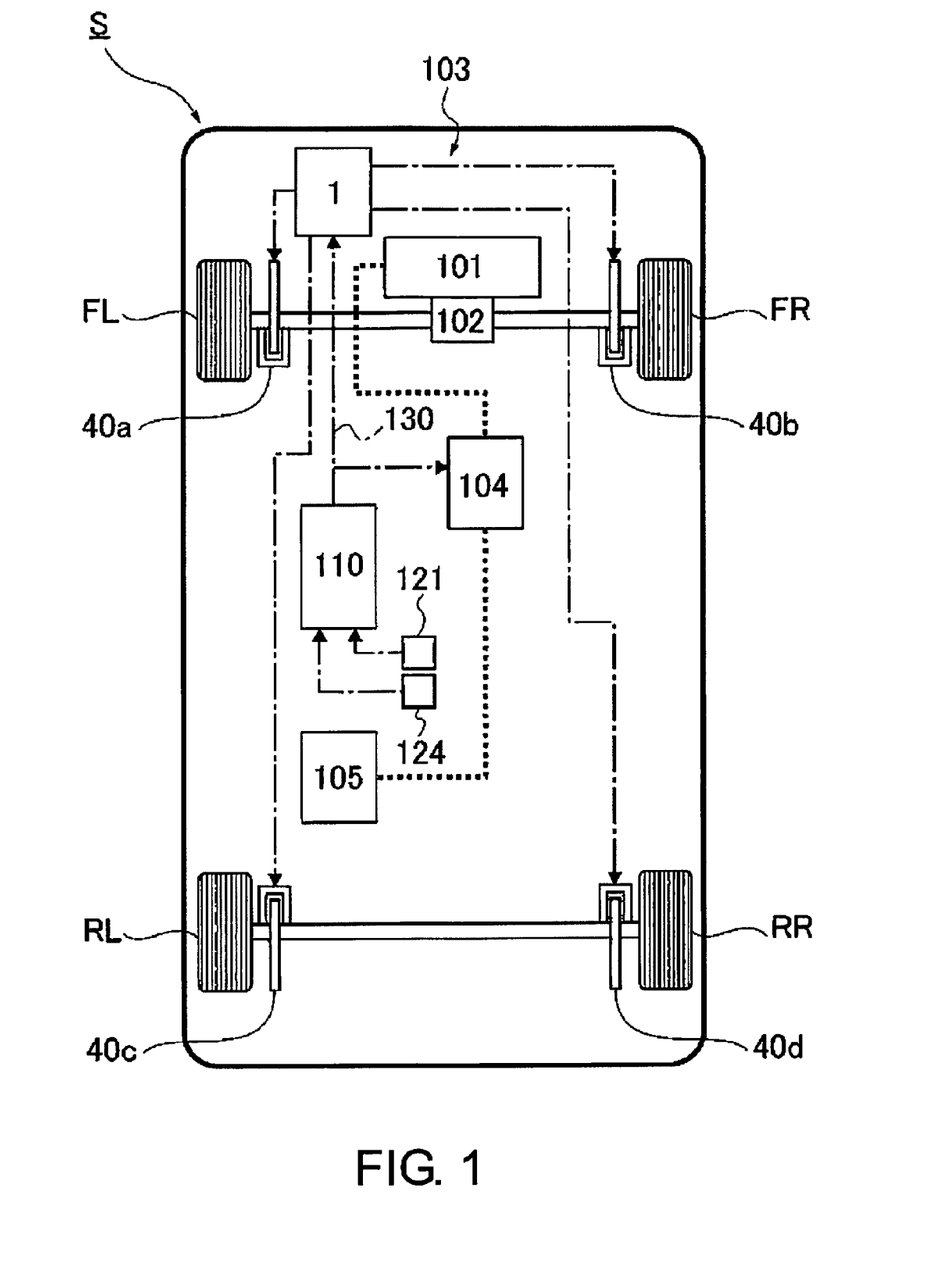
FIG. 1 is an overall view of an essential structure of an electric vehicle that has adopted the vehicle braking control device of Embodiment 1.

FIG. 1 is an overall view of an essential structure of an electric vehicle that has adopted the vehicle braking control device pursuant to Embodiment 1.

As shown in FIG. 1, an electric vehicle S pursuant to Embodiment 1 is equipped with a motor/generator 101; a reduction drive 102; a braking mechanism 103; left and right front wheels (drive wheels) FL, and FR; left and right rear wheels RL, and RR; and an integrated controller 110.

The motor/generator 101 is a synchronous type motor/generator with a permanent magnet embedded in a rotor, and a stator coil wrapped around a stator. This is interlocked to the left and right front wheels FL, FR via the reduction drive 102. Also, the motor/generator 101 is controlled by charging a three-phase AC current created by a drive circuit 104, based on a control instruction from the integrated controller 110.

The drive circuit 104 controls giving and receiving electrical power with a battery 105 composed of a lithium ion battery or the like, for the example. The motor/generator 101 acts as an electric motor that is rotatably driven by receiving a supply of electrical power from the battery, by the control of the drive circuit 104. When the rotor receives rotating energy from the left and right front wheels FL and FR, which are the drive wheels, it is possible to charge the battery by functioning as an electric power generator that produces electromotive force at both ends of the stator coil. At this time, the drive circuit 104 adjusts so that a drive torque or regenerative torque that is produced by the motor/generator 101 matches the torque instruction value sent from the integrated controller 110.

The braking mechanism 103 includes disc rotors 40a-40d in a hydraulic braking system disposed on each FL, FR, RL, RR wheel, and a braking device 1. The braking device 1 activates a brake hydraulic on each of the disc rotors 40a-40d in response to a braking operation implemented by the driver thereby imparting frictional braking torque on each of the FL, FR, RL, and RR wheels. Also, this controls frictional braking torque based on a regenerative coordinated control instruction from the integrated controller 110.

The integrated controller 110 has a feature for driving the electric automobile S at maximum efficiency by controlling energy consumed by the entire vehicle. This inputs necessary information from a motor-speed sensor 121 that detects a motor speed Nm, and from a wheel-speed sensor 124 or the like that detects the wheel speeds of each of the right and left wheels FL and FR and the rear wheels RL, and RR, and information via a CAN communication line 130. Also, this executes drive control or regenerative control at the motor/generator 101 by outputting a control instruction to the drive circuit 104, and executes braking control by outputting a control instruction to the braking device 1.

In such an arrangement, the integrated controller 110 implements energy recovery with high energy recovery efficiency using regenerative braking up, to a low vehicle speed, particularly in a driving pattern that repeats acceleration and deceleration, by distributing with priority to regenerative braking torque with regard to the target deceleration speed.

Conversely, in the regenerative braking torque, an upper limit torque is established in correspondence with a speed determined by the vehicle speed. Accordingly, when the overall target deceleration speed cannot be completely covered only when decelerating to the target deceleration speed using the regenerative braking torque, a regenerative coordinated control instruction is outputted to the braking device 1 so that the deficit can be compensated for with the hydraulic braking torque using the braking mechanism 103.

Configuration of the Braking Device

Figure 2:
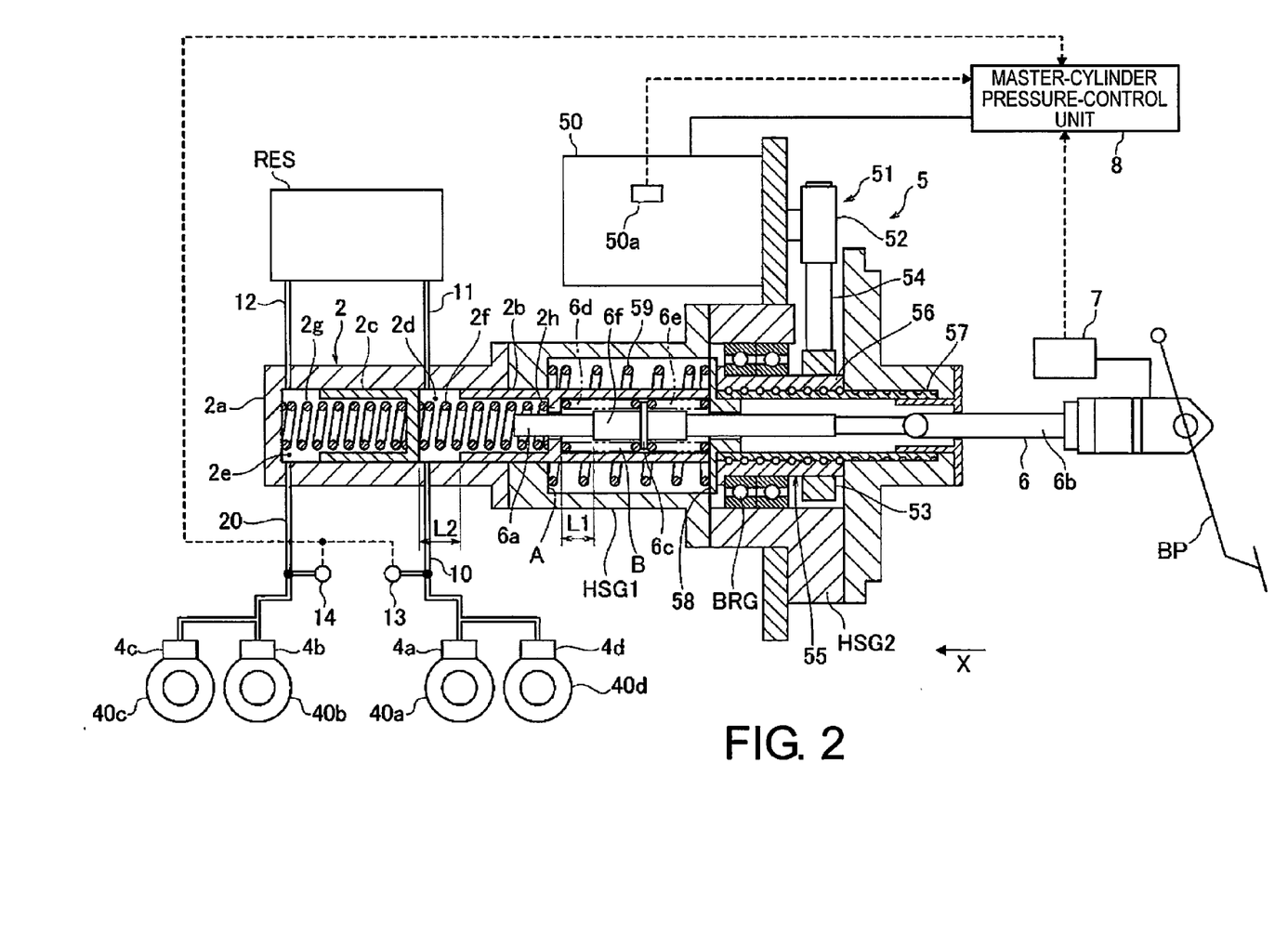

FIG. 2 is an overall structural view of a braking device in the vehicle braking control device pursuant to Embodiment 1.

The braking device 1 includes a master cylinder 2; a reservoir tank RES; wheel cylinders 4a-4d disposed on each of the FL, FR, RL, and RR wheels; a master-cylinder pressure-control mechanism 5 and input rod (input member)

6 disposed connected to the master cylinder 2; a brake-operation amount detection unit 7; and a master-cylinder pressure-control unit 8 that controls the master-cylinder pressure-control mechanism 5.

The input rod 6 moderates a fluid pressure (hereinafter referred to as master-cylinder pressure Pmc) in the master cylinder 2 by cycling (advance or retreat) by operation of the brake pedal BP. The master-cylinder pressure-control mechanism 5 and the master-cylinder pressure-control unit 8 moderate the master-cylinder pressure Pmc by cycling the primary piston (assist member) 2b of the master cylinder 2.

Below, for the description, an X axis is set for an axial direction of the master cylinder 2; the brake pedal BP side is defined as a negative direction. The master cylinder 2 pursuant to Embodiment 1 is a so-called tandem type. This includes the primary piston (assist member) 2b and a secondary piston 2c in a cylinder body 2a. A primary hydraulic chamber 2d is formed as a first hydraulic chamber between an inner periphery of the cylinder body 2a, a face in a positive direction on the X axis of the primary piston 2b, and a face of the negative direction on the X axis of the secondary piston 2c. A secondary hydraulic chamber 2e is formed as a second hydraulic chamber between the inner periphery of the cylinder body 2a, and a face at a positive direction on the X axis of the secondary piston 2c.

The primary hydraulic chamber 2d is communicably connected to a primary circuit 10 and the secondary hydraulic chamber 2e is communicably connected to the secondary circuit 20. The primary hydraulic chamber 2d volume varies by a stroke of the primary piston 2b and the secondary piston 2c inside the cylinder body 2a. A return spring 2f that urges the primary piston 2b in the negative direction on the X axis is disposed in the primary hydraulic chamber 2d. The secondary hydraulic chamber 2e volume varies by a stroke of the secondary piston 2c inside the cylinder body 2a. A return spring 2g that urges the secondary piston 2c in the negative direction on the X axis is disposed in the secondary hydraulic chamber 2e. Also, although not shown in the drawings, various valves, motor pumps, reservoirs and the like are disposed on the primary circuit 10 and the secondary circuit 20 to implement ABS control and the like.

A primary hydraulic sensor (master-cylinder pressure-detection means or device) 13 is disposed on the primary circuit 10; a secondary hydraulic sensor (master-cylinder pressure-detection means or device) 14 is disposed on the secondary circuit 20. The primary hydraulic sensor 13 detects fluid pressure in the primary hydraulic chamber 2d; the secondary hydraulic sensor 14 detects the fluid pressure in the secondary hydraulic chamber 2e. This fluid pressure information is sent to the master-cylinder pressure-control unit 8.

Also, here, a detection value (fluid pressure in the primary hydraulic chamber 2d) of the primary hydraulic sensor 13 is the master-cylinder pressure Pmc.

One end 6a of the input rod 6 in the positive direction on the X axis is grounded inside the primary hydraulic chamber 2d, penetrating a bulkhead 2h of the primary piston 2b. A space between the end 6a of the input rod 6 and the bulkhead 2h of the primary piston 2b is sealed to ensure fluid tightness; the end 6a is disposed to be able to slide on the X axis direction in the bulkhead 2h. Conversely, another end 6b of the input rod 6 in the negative direction on the X axis is interlocked to the brake pedal BP. When the driver depresses the brake pedal BP, the input rod 6 moves in the positive direction on the X axis; when the driver returns the brake pedal BP, the input rod 6 moves in the negative direction on the X axis.

A large diameter unit 6f is formed on the input rod 6, having a larger diameter than an inner periphery of the bulkhead 2h in the primary piston 2b, and a smaller diameter than an outer diameter of a plunge unit 6c. A gap L1 when the brake is not being activated, is disposed between a side face of the large diameter unit 6f in the positive direction on the X axis and a side face of the bulkhead 2h in the negative direction on the X axis. Because of this gap L1, it is possible to reduce a pressure of the hydraulic brake for the amount of regenerative braking by relative movement of the primary piston 2b in the negative direction on the X axis with regard to the input rod 6 when the regenerative coordinated control instruction is received from the integrated controller 110. Also, because of this gap L1, when the input rod 6 is relatively displaced the amount of the gap L1 in the positive direction on the X axis to the primary piston 2b, the face of the large diameter unit 6f in the positive direction on the X axis and the bulkhead 2h touch, making it possible for the input rod 6 and the primary piston 2b to move as one body.

Hydraulic fluid in the primary hydraulic chamber 2d is compressed by the input rod 6 or the primary piston 2b moving in the positive direction on the X axis thereby supplying compressed hydraulic fluid to the primary circuit 10. Also, the secondary piston 2c moves in the positive direction on the X axis by compression of the primary hydraulic chamber 2d caused by the compressed hydraulic fluid. Operating fluid in the secondary hydraulic chamber 2e is compressed by the secondary piston 2c moving in the positive direction on the X axis thereby supplying compressed operating fluid to the secondary circuit 20.

As described above, because of the configuration in which the input rod 6 is interlocked and moves with the brake pedal BP to compress the primary hydraulic chamber 2d, it is possible to ensure a predetermined braking force by raising the master-cylinder pressure Pmc by the driver operating the brake, even in the event that the drive motor (power assist actuator) 50 in the master-cylinder pressure-control mechanism 5 is stopped because of a malfunction. Also, because force pursuant to the master-cylinder pressure Pmc acts on the brake pedal BP via the input rod 6, and is transmitted to the driver as brake pedal reactive force, a device such as a spring or the like is unnecessary to generate the brake pedal reactive force that is required when the constitution described above is not adopted. Therefore, the brake power-assist device is more compact and lighter in weight, and installation on a validation is improved.

The brake-operation amount detection unit 7 detects the driver's required deceleration speed, and is disposed at the other end 6b of the input rod 6. The brake-operation amount detection unit 7 is a stroke sensor that detects a displacement amount (stroke) of the input rod 6 on the X axis direction; in other words, this is a stroke sensor for the brake pedal BP.

The reservoir tank RES has at least two hydraulic chambers mutually partitioned by a bulkhead (not shown in the drawing). Each hydraulic chamber is communicably connected to the primary hydraulic chamber 2d and the secondary hydraulic chamber 2e of the master cylinder 2 via brake circuits 11 and 12.

Wheel cylinders (frictional braking units) 4a-4d include cylinders, pistons and pads and the like. The pistons are moved by operating fluid supplied to the cylinder unit 2a; pads that are interlocked to the pistons are pushed by the disc rotors 40a-40d. Also, disc rotors 40a-40d rotate as one body with each FL, FR, RL, RR wheel; braking torque that acts on the disc rotors 40a-40d is the braking force that acts between each FL, FR, RL, RR wheel, and a road surface.

The master-cylinder pressure-control mechanism 5 controls the displacement amount of the primary piston 2b that is proportional to the master-cylinder pressure Pmc according to a control instruction from the master-cylinder pressure-control unit 8, and includes the drive motor 50, a speed reducer 51, and a rotation-rectilinear transducer 55.

The master-cylinder pressure-control unit 8 is an arithmetic processing circuit. It controls the actions of the drive motor 50 based on sensor signals and the like from the brake-operation amount detection unit 7 and the drive motor 50.

A configuration and behavior of the master-cylinder pressure-control mechanism 5 will now be described. The drive motor 50 is a three-phase, DC, brushless motor; it is operated by electric power that is supplied based on a control signal from the master-cylinder pressure-control unit 8 to generate the predetermined rotational torque.

The speed reducer 51 reduces an output rotation of the drive motor 50 using a pulley deceleration method. The speed reducer 51 includes a small diameter drive-side pulley 52 disposed on an output shaft of the drive motor 50, a large diameter follower-side pulley 53 disposed on a ball-screw nut 56 on the rotation-rectilinear transducer 53, and a belt 54 trained around the drive side and follower side pulleys 52 and 53. The speed reducer 51 transmits rotational torque of the drive motor 50 to the rotation-rectilinear transducer 55 by amplifying only the deceleration ratio (a radius ratio of the drive side and follower side pulleys 52, and 53).

The rotation-rectilinear transducer 55 converts the rotational power from the drive motor 50 into a rectilinear power. That rectilinear power pushes the primary piston 2b. With Embodiment 1, a ball-screw method was adopted as the power-conversion mechanism. The rotation-rectilinear transducer 55 includes the ball-screw nut 56, a ball-screw shaft 57, a movable member 58, and a return spring 59.

A first housing member HSG1 is connected to the negative direction of the master cylinder 2 on the X axis; a second housing member HSG2 is connected to the negative direction of the first housing member HSG1 on the X axis. The ball-screw nut 56 is disposed to be rotatable at an inner periphery of a bearing BRG disposed in the second housing member HSG2. At an outer circumference of the ball-screw nut 56 is fitted the follower side pulley 53. At an inner periphery of the ball-screw nut 56 is threaded a hollow ball-screw shaft 57. A plurality of holes is disposed to be able to rotate in a gap between the ball-screw nut 56 and the ball-screw shaft 57.

The movable member 58 is integrated to an end of the ball-screw shaft 57 in positive direction on the X axis; the primary piston 2b is mated to a face of movable member 58 in the positive direction on the X axis. The primary piston 2b is housed inside the first housing member HSG1, and an end of the primary piston 2b in the positive direction on the X axis is fitted in the inner periphery of the primary piston 2b projecting from the first housing member HSG1.

The return spring 59 is disposed at an outer circumference of the primary piston 2b inside the first housing member HSG1. One end of the return spring 59 is fastened to a face A inside the first housing member HSG1 in the positive direction on the X axis; one end engages the movable member 58 in the negative direction on the X axis. The return spring 59 is disposed to be pressed and collapsed between the face A and the movable member 58; it urges the movable member 58 and the ball-screw shaft 57 in the negative direction on the X axis.

When the follower-side pulley 53 rotates, the ball-screw nut 56 rotates as one body; the ball-screw shaft 57 implements lateral motion in the X direction by the rotating motion of the ball-screw nut 56. The primary piston 2b is pushed in the positive direction on the X axis via the movable member 58 by a thrust force from the lateral motion of the ball-screw shaft 57 in the positive direction on the X axis. Also, FIG. 2 shows a status where the ball-screw shaft 57 is at an initial position with maximum displacement in the negative direction on the X axis when the brake is not being operated.

Conversely, elastic force of the return spring 59 acts on the ball-screw shaft 57 in a direction (in the negative direction on the X axis) opposite to the thrusting force toward the positive direction on the X axis. With this, while braking; i.e., in a state where the primary piston 2b is pressed in the positive direction on the X axis compressing the hydraulic fluid in the primary hydraulic chamber 2d, if the drive motor 50 is stopped because of a malfunction, causing the return control of the ball-screw shaft 57 to be impossible, the reactive force of the return spring 59 returns the ball-screw shaft 57 to its initial position. With this, the master-cylinder pressure Pmc will drop near to zero thereby preventing drag from occurring in the braking force, and circumventing a state where vehicle behavior will become unstable because of the drag.

Also, a pair of springs (urging means) 6d, and 6e are arranged in an annular gap B defined between the input rod 6 and the primary piston 2b. One end of each of the pair of springs 6d, and 6e is locked to a flange unit 6c disposed on the input rod 6; another end of the spring 6d is locked to the bulkhead 2h on the primary piston 2b; the other end of the spring 6e is locked to the movable member 58. The pair of springs 6d, and 6e urge the input rod 6 to the primary piston 2b toward a neutral position of the relative displacement of both, and function to hold the input rod 6 and the primary piston 2b in the neutral position of relative movement when there is no braking action. An urging force acts to return the input rod 6 to the neutral position with regard to the primary piston 2b when the input rod 6 and the primary piston 2b are relatively displaced in either direction from the neutral position, by one of these springs 6d, and 6e.

Also, a revolution-angle detection sensor (assist member movement amount detection means) 50a, such as a resolver or the like for example, is disposed on the drive motor 50. A position signal of the motor output shaft detected by this is inputted to the master-cylinder pressure-control unit 8. The master-cylinder pressure-control unit 8 calculates the revolution angle of the drive motor 50 based on the inputted position signal, and calculates a drive amount of the rotation-rectilinear transducer 55, in other words, the displacement amount of the primary piston 2b on the X axis direction of the position, based on this revolution angle.

Next, an amplification action of the input rod 6 thrusting force by the master-cylinder pressure-control mechanism 5 and the master-cylinder pressure-control unit 8 will now be described. With Embodiment 1, the master-cylinder pressure-control unit 8 controls displacement of the primary piston 2b in response to the displacement of the input rod 6 by the drive motor 50. In other words, this controls the degree of relative displacement ΔX of the input rod 6 and the primary piston 2b.

The master-cylinder pressure-control mechanism 5 and the master-cylinder pressure-control unit 8 are equipped with a target deceleration speed computing unit (not shown in the drawing) to calculating the target deceleration speed that is determined by the amount of displacement of the input rod 6 by the driver operating the brake. This also displaces the primary piston 2b in response to the target deceleration speed. This compresses the primary hydraulic chamber 2d by the thrusting force of the primary piston 2b by adding thrusting force of the input rod 6, and adjusts the master-cylinder pressure Pmc. In other words, the thrusting force of the input rod 6 is amplified. An amplification rate (hereinafter referred to as power assist ratio α) is determined in the following way using a ratio and the like of the cross-sectional area in the axial direction (hereinafter referred to as pressure bearing areas AIR and APP) of the input rod 6 and the primary piston 2b in the primary hydraulic chamber 2d.

Implement fluid pressure adjustments of the master-cylinder pressure Pmc with a pressure equilibrium relationship shown in Equation (1), below.

$$Pmc=(FIR+K\times \Delta x)/AIR=(FPP-K\times \Delta x)/APP \quad (1)$$

Here, the following defines each element in the pressure equilibrium equation (1).
- Pmc: Fluid pressure in the primary hydraulic chamber 2d (master-cylinder pressure)
- FIR: Thrusting force of the input rod 6
- FPP: Thrusting force of the primary piston 2b (assist thrusting force)
- AIR: Pressure bearing area of the input rod 6
- APP: Pressure bearing area of the primary piston 2b
- K: Springs 6d, and 6e spring constant
- Δx: Degree of relative displacement between the input rod 6 and the primary piston 2b With Embodiment 1, the pressure bearing area AIR on the input rod 6 is set to be smaller than the pressure bearing area APP on the primary piston 2b.

Here, the degree of relative displacement Δx is defined by Δx=Xb−Xi, with the displacement amount of the input rod 6 (hereinafter referred to as input rod stroke) as Xi, and the displacement amount of the primary piston 2b (hereinafter referred to as piston stroke) as Xb. Therefore, the degree of relative displacement Δx is 0 at the neutral position in relative movement, and is a positive sign in a direction where the primary piston 2b moves forward (strokes toward the positive direction on the X axis) with regard to the input rod 6, and is a negative sign in a reverse direction. Also, the seal sliding resistance is ignored in the pressure equilibrium equation (1). Thrusting force FPP of the primary piston 2b can be estimated from the current value of the drive motor 50.

Conversely, the power assist ratio α can be expressed as shown in the equation (2) below.

$$A=Pmc\times (APP+AIR)/FIR \quad (2)$$

Therefore, the equation (3), below, is attained for the power assist ratio α by substituting Pmc of equation (1) in equation (2).

$$\alpha =(1+K\times \Delta x/FIR)\times (AIR+APP)/AIR \quad (3)$$

With the power assist control, adjust the primary stroke Xb by controlling the drive motor 50 so that the target master-cylinder pressure characteristic (hereinafter referred to as target master-cylinder pressure characteristic) is attained. Here, master-cylinder pressure characteristic means a change characteristic of the master-cylinder pressure Pmc with regard to the input rod stroke Xi. It is possible to attain a stroke characteristic that indicates the piston stroke Xb with regard to the input rod stroke Xi, and the target displacement amount calculation characteristic that indicates the change in the degree of relative displacement Δx with regard to the input rod stroke Xi that corresponds to the target master-cylinder pressure characteristic. Calculate the target value of the degree of relative displacement Δx (hereinafter referred to as the target degree of relative displacement Δx*) based on the target displacement-amount calculation-characteristic data.

In other words, one target degree of relative displacement Δx* is defined with regard to the input rod stroke Xi, indicating the change characteristic of the target degree of relative displacement Δx* with regard to the input rod stroke Xi, in the target displacement amount calculation characteristic. By controlling the rotation (displacement amount Xb of the primary piston 2b) of the drive motor 50 that implements the target degree of relative displacement Δx* determined to correspond to the detected input rod stroke Xi, a master-cylinder pressure Pmc of a size that corresponds to the target degree of relative displacement Δx* is generated at the master cylinder 2.

Here, the input rod stroke Xi as described above is detected by the brake-operation amount detection unit 7, the piston stroke Xb is calculated based on a signal from the revolution-angle detection sensor 50a, and the degree of relative displacement Δx can be found by a difference in the detected (calculated) displacement amount. Specifically, with power assist control, set the target degree of relative displacement Δx* based on the degree of relative displacement Δx and the target displacement-amount calculation characteristics, and control (feedback control) the drive motor 50 so that the detected (calculated) degree of relative displacement Δx matches the target degree of relative displacement Δx*. Also, it is acceptable separately to dispose a stroke sensor that detects the piston stroke Xb.

With Embodiment 1, because power assist control is implemented without using a depressing force sensor, the cost is reduced for that amount. Also, by controlling the drive motor 50 so that the degree of relative displacement Δx becomes any optional, predetermined value, it is possible to attain a power assist ratio that is higher, or a power assist ratio that is lower than the power assist ratio determined by the pressure bearing area (AIR+APP)/AIR, and it is possible to attain a braking force based on the predetermined power assist ratio.

Constant power assist control integrally displaces the input rod 6 and the primary piston 2b. In other words, the primary piston 2b is constantly at the neutral position with regard to the input rod 6, and the drive motor 50 is controlled for displacement with degree of relative displacement Δx=0.

In this way, by cycling the primary piston 2b so that Δx=0, the power assist ratio is uniquely determined as α=(AIR+APP)/AIR. Therefore, it is possible always to attain a constant (the necessary one below) power assist ratio by setting AIR and APP based on the necessary power assist ratio, and controlling the primary piston 2b so that the piston stroke Xb is equivalent to the input rod stroke Xi.

With the target master cylinder characteristic in the constant power assist control, the master-cylinder pressure Pmc generated along with the forward movement of the input rod 6 (displacement in the positive direction on the X axis) becomes larger in a quadratic curve, cubic curve or multi-dimensional curve (hereinafter referred to as these are collectively referred to as multi-order curves) that are a compound of high-order curves and the like that are higher than these. Also, the constant power assist control includes a stroke characteristic where the primary piston 2b cycles (Xb=Xi) only a same amount as the input rod stroke Xi. With the target displacement-amount calculation characteristic obtained based on this stroke characteristic and the target master-cylinder pressure characteristic, the target degree of relative displacement $\Delta x^*$ is 0 with regard to every input rod stroke Xi.

Conversely, the power assist control sets the target degree of relative displacement $\Delta x^*$ to a predetermined positive value and controls the drive motor 50 so that the degree of relative displacement $\Delta x$ becomes this predetermined value. With this, the piston stroke Xb of the primary piston 2b increases compared to the input rod stroke Xi following the input rod 6 movement forward toward a direction to increase the master-cylinder pressure Pmc. With the equation (3) above, the power assist ratio $\alpha$ becomes a size twice that of $(1+K\times\Delta x/FIR)$. In other words, this is synonymous to cycling the primary piston 2b only for an amount multiplying a proportional gain $(1+K\times\Delta x/FIR)$ by the input rod stroke Xi. In this way, the power assist ratio $\alpha$ is changed in response to the $\Delta x$. The master-cylinder pressure-control mechanism 5 acts as a power assist source making it possible to generate a braking force as required by the driver and to attain a great reduction in pedal effort.

In other words, from the viewpoint of controllability, it is desirable for the proportional gain $(1+K\times\Delta x/FIR)$ described above to be 1. However, if a braking force is temporarily required that is higher than the driver's brake operation amount, such as when emergency braking or the like, for example, it is possible to change the proportional gain to a value that exceeds 1.

With this, even with the same amount of braking operation, it is possible to raise the master-cylinder pressure Pmc compared to normal use (when the proportional gain is 1) so it is possible to generate a large braking force. Here, judgment of an emergency braking is possible by judging whether the time change rate of a signal from the brake-operation amount detection unit 7 exceeds the predetermined value.

In this way, the power assist control is a method for controlling the drive motor 50 that advances forward movement of the primary piston 2b more with regard to the forward movement of the input rod 6, and the degree of relative displacement $\Delta x$ of the primary piston 2b with regard to the input rod 6 becomes larger along with the forward movement of the input rod 6. In response to this, the increase in the master-cylinder pressure Pmc becomes higher than the constant power assist control along with the forward movement of the input rod 6.

With the target master-cylinder pressure characteristic in the power assist variable control, the increase in the master-cylinder pressure Pmc that is generated along with the forward movement (displacement in the positive direction on the X axis) of the input rod 6 becomes larger than the constant power assist control (the master-cylinder pressure characteristic that increases in the multidimensional curves is more precipitous). Also, the power assist control includes a stroke characteristic where an increase in the piston stroke Xb is greater than one with regard to the increase in the input rod stroke Xi. With the target displacement-amount calculation-characteristic obtained based on this stroke characteristic and the target master-cylinder pressure characteristic, the target degree of relative displacement $\Delta x^*$ increases at a predetermined rate in response to the increase of the input rod stroke Xi.

Also, as the power assist variable control, in addition to the control described above (controlling the drive motor 50 so that the piston stroke Xb is large compared to the input rod stroke Xi, following the movement of the input rod 6 in a direction to increase the master-cylinder pressure Pmc), this controls the drive motor 50 so that the piston stroke Xb becomes smaller compared to the input rod stroke Xi, following the movement of the input rod 6 in the direction to increase the Pmc. With this, it is possible to reduce frictional braking torque in response to the increase in the regenerative braking torque when implementing regenerative coordinated control.

Control System Configuration

Figure 3:
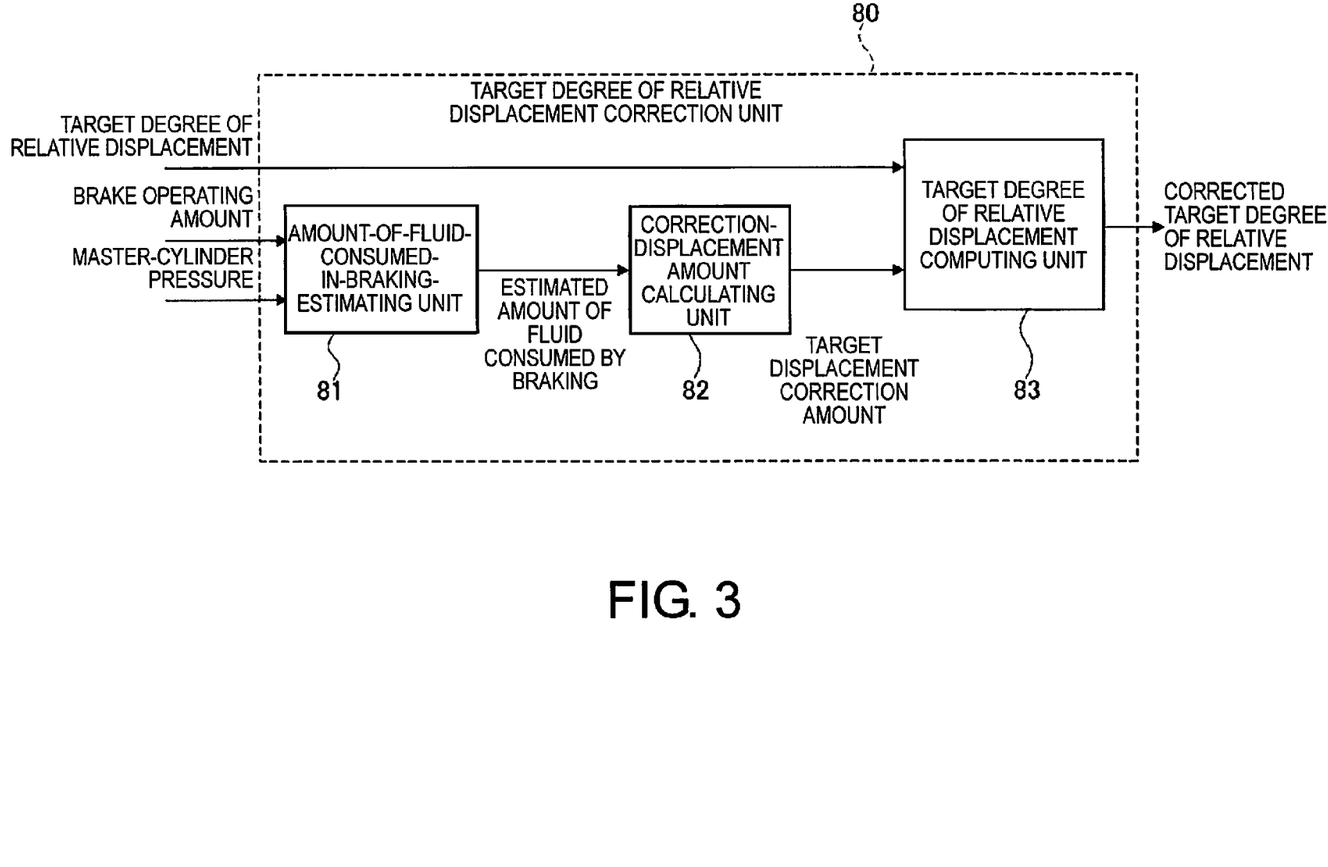
FIG. 3 is a configuration block diagram of a target degree of relative displacement correction unit in the vehicle braking control device of Embodiment 1.

FIG. 3 is a control block diagram of a target relative displacement-amount correction unit in the vehicle braking control device pursuant to Embodiment 1.

The master-cylinder pressure-control unit 8 is equipped with a target relative displacement-amount correction unit (control means) 80, shown in FIG. 3. The target relative displacement-amount correction unit 80 is equipped with a brake consumed fluid amount estimating unit (brake consumed fluid amount estimating means) 81, a correction-displacement amount calculating unit (correction-amount-calculating means) 82, and a target relative displacement-computing unit (target value correcting means) 83.

With the brake consumed fluid amount estimating unit 81, a target master-cylinder pressure Ps* that is required for implementing braking force is calculated based on a target deceleration speed computed by the target deceleration speed computing unit in response to an operating amount of the brake pedal BP detected by the brake-operation amount detection unit 7. Furthermore, the brake consumed fluid-amount estimating unit 81 includes a consumed fluid-amount fluid-pressure reference characteristic (reference map) that is a preset reference, and calculates the amount of fluid consumed by braking (estimated amount of fluid consumed by braking Q$\alpha$) that is required for generating the calculated target master-cylinder pressure Ps* from this consumed fluid-amount fluid-pressure reference characteristic.

Also, the amount of fluid consumed by braking is an amount of brake fluid supplied to the wheel cylinders 4a-4d, by movement of the input rod 6 and the primary piston 2b.

Figure 4:
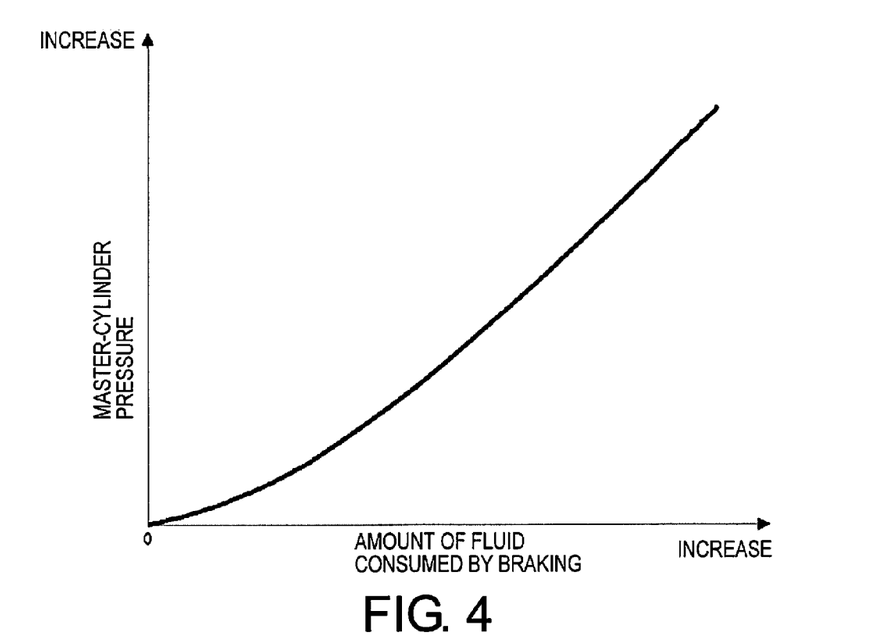
FIG. 4 is a view of one example of an amount of fluid consumed by braking and a reference map used in the vehicle braking control device of Embodiment 1.

Also, as shown in FIG. 4, the consumed fluid-amount fluid-pressure reference characteristic is a reference map preset with relationship characteristics of the amount of fluid consumed by braking Q and the master-cylinder pressure Pmc. The consumed fluid-amount fluid-pressure reference characteristic has a characteristic that when the amount of fluid consumed by braking Q increases, the master-cylinder pressure Pmc increases. This is a characteristic of a multi-order curve that compounds high-order curves.

Here, by approximating the consumed fluid-amount fluid-pressure reference characteristic in a multi-order curve and learning by using an iterative least-squares technique and the like on the parameters, it is possible to handle changes such as degradation over time. Specifically, by learning and calibrating the consumed fluid amount fluid-pressure reference characteristic based on the amount of fluid consumed by braking Q and a detection value of the actual master cylinder PmcA, it is possible to update the consumed fluid-amount fluid-pressure reference characteristic. For that reason, it is possible more accurately to correct the target degree of relative displacement $\Delta x^*$ when the amount of fluid consumed by braking temporarily changes because of a back-face supplement or air becoming mixed into the brake fluid.

Also, the amount of fluid consumed by braking Q which is an intake characteristic in the consumed fluid-amount fluid-pressure reference characteristic is calculated based on equation (4) below, from the input rod stroke Xi, and the piston stroke Xb of the primary piston 2b. Also, for the master-cylinder pressure which is an output characteristic, use the actual master-cylinder pressure PmcA detected by the primary hydraulic sensor 13 and the secondary hydraulic sensor 14.

$$Q = Xi \times AIR + (Xb - \Delta XRES) \times APP \quad (4)$$

Here, the following defines each element in the equation (4).

AIR: Pressure bearing area of the input rod 6
ΔXRES: Displacement amount until the primary piston 2b closes the reservoir RES port
APP: Pressure bearing area of the primary piston 2b The correction-displacement amount calculating unit 82, calculates the target displacement-correction amount Δxδ which is a correction amount of the target degree of relative displacement Δx*, so that the characteristics difference is reduced when a characteristics difference ΔV occurs between the estimated amount of fluid consumed by braking Qα calculated by the brake consumed fluid amount estimating unit 81 and a required amount of fluid consumed by braking Q1 found using the actual master-cylinder pressure PmcA and the consumed fluid amount fluid-pressure reference characteristic.

The target relative displacement-computing unit 83 calculates the target degree of relative displacement Δx** after correcting by subtracting from the target degree of relative displacement Δx* the target displacement-correction amount Δxδ that was calculated by the correction-displacement amount calculating unit 82, and correcting the target degree of relative displacement Δx*.

Target Displacement-Correction Amount Calculating Process Configuration

Figure 5:
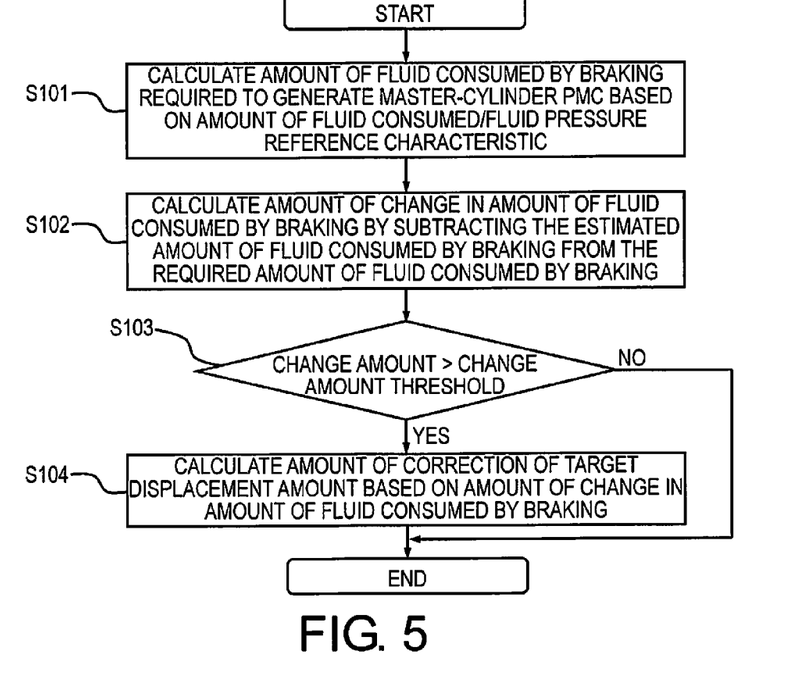
FIG. 5 is a flowchart showing a flow of a calculating process of the target relative displacement correction amount executed by the target degree of relative displacement correction unit of Embodiment 1.

FIG. 5 is a flowchart showing a flow of a calculating process of the target relative displacement correction amount executed by a brake controller in Embodiment 1. Each step depicted in FIG. 5 will now be described below.

At step S101, the amount of fluid consumed by braking (required amount of fluid consumed by braking Q1) required to generate the actual master-cylinder pressure PmcA is calculated using the detected master-cylinder pressure PmcA and the consumed fluid amount fluid-pressure reference characteristic that is a reference; thereafter the process shifts to step S102.

Here, the master-cylinder pressure PmcA is calculated based on the fluid pressure in the primary hydraulic chamber 2d detected by the primary hydraulic sensor 13, and the fluid pressure in the secondary hydraulic chamber 2e detected by the secondary hydraulic sensor 14.

At step S102, continuing from the calculation of the required amount of fluid consumed by braking Q1 at step S101, the amount of fluid consumed by braking change amount (increase/decrease amount) |ΔV|, in other words, an amount of deviation from the target is calculated based on a difference (fluid amount difference) between the required amount of fluid consumed by braking Q1, and the estimated amount of fluid consumed by braking Qα estimated at the brake consumed fluid amount estimating unit 81, and the process shifts to step S103.

Here, the amount of fluid consumed by braking change amount |ΔV| is calculated by subtracting the estimated amount of fluid consumed by braking Qα from the required amount of fluid consumed by braking Q1.

With step S103, continuing from calculating the amount of fluid consumed by braking change amount |ΔV| at step S102, it is judged whether this amount of fluid consumed by braking change amount |ΔV| exceeds a preset change amount threshold th. If the result is YES (change amount>change amount threshold th), the process shifts to step S104. If NO (change amount≤change amount threshold th), it is judged that the amount of fluid consumed by braking change amount |ΔV|, in other words the amount of deviation from the target, is small, and does not require correction. The process shifts to the end, and quits the correction amount calculation process.

Here, the change amount threshold th is set to any value, giving consideration to sensor error or variations in manufacturing and the like, for example. Also, it is acceptable to set the change amount threshold th to an offset with regard to the amount of change where the driver does not feel a change in the pedal feeling or the like.

At step S104, continuing from the judgment of change amount>change amount threshold th, the correction amount of the target degree of relative displacement Δx* (target displacement-correction amount Δxδ) is calculated at step S103. The process shifts to the end.

Here, the target displacement-correction amount Δxδ is found in the following way, for example.

Initially, the master-cylinder pressure calculated based on the target deceleration speed found using the piston stroke Xb is the target master-cylinder pressure Ps*. Here, the calculation of the master-cylinder pressure Ps* from the target deceleration speed is implemented using a coefficient found at that time, by pre-measuring a relationship between the deceleration speed and the pressure.

Next, if the correction amount of the target degree of relative displacement Δx* when the amount of fluid consumed by braking changed only |ΔV| with regard to the amount of fluid consumed by braking (estimated amount of fluid consumed by braking Qα) that is required for the target master-cylinder pressure Ps* is used as the target displacement-correction amount Δxδ, the master-cylinder pressure Psa with regard to the input rod stroke Xi is expressed in equation (5) below as a function of the consumed fluid-amount fluid-pressure reference characteristic.

$$Psa = f(Xi, \Delta x^* - \Delta x\delta, |\Delta V|) \quad (5)$$

For that reason, when correcting the target degree of relative displacement Δx*, a master-cylinder pressure change amount Pe is expressed in equation (6) below.

$$Pe = Ps^* - Psa \quad (6)$$

Also, the depressing force is FIR* when the target master-cylinder pressure Ps* from the relationship in the pressure equilibrium equation (1). Conversely, when the target degree of relative displacement Δx* is corrected only the target displacement-correction amount Oxo, the fluid pressure FIRa that is required to generate the master-cylinder pressure Psa is calculated using the equation (7) below.

$$FIRa = Ps - AIR - K \times (\Delta x^* - \Delta x \delta a) \quad (7)$$

For that reason, when correcting the target degree of relative displacement Δx*, a depressing force change amount FIRe is expressed in equation (8) below.

$$FIRe = FIR^* - FIRa \quad (8)$$

Also, an evaluation function J shown in equation (9) below is set; J is set to a minimum value for the target displacement-correction amount Δxδ.

$$J = (P^* - Pe)^T R\_1 (P^* - Pe) + (FIR^* - FIRe)^T R\_2 (FIR^* - FIRe) \quad (9)$$

Each element in the evaluation function J is defined below.

R_1: Weighting for changes in the master-cylinder pressure
R_2: Weighting for changes in the depressing force Also, R_1 and R_2 are set by balancing so that the driver does not feel any unpleasantness in changes of the pedal feel.

Target displacement-correction operations in the braking control device pursuant to Embodiment 1 will now be described.

Figure 6:
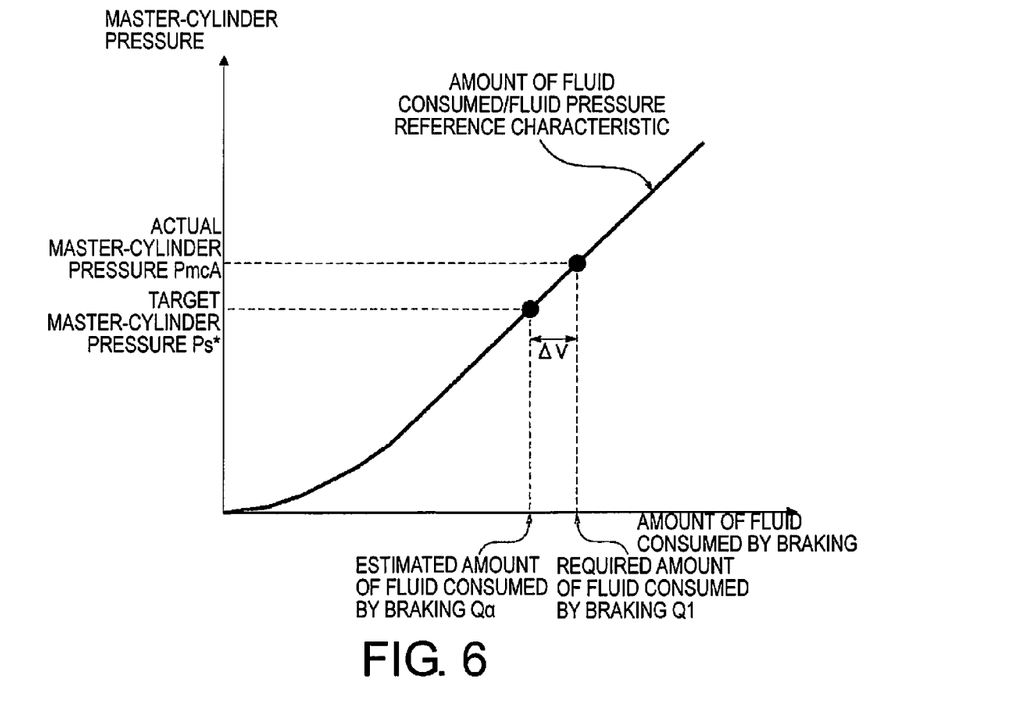
FIG. 6 is a map of a characteristic representing a relationship between the amount of fluid consumed by braking and master-cylinder pressure, showing a corrective action of the target displacement amount, when the actual master-cylinder pressure is high.

FIG. 6 is a relationship characteristic map of the amount of fluid consumed by braking and master-cylinder pressure, showing an action of a target displacement correction implemented by the vehicle braking control device in Embodiment 1.

To control the degree of relative displacement $\Delta x$ of the input rod 6 and the primary piston 2b in the vehicle braking control device in Embodiment 1, first, the target degree of relative displacement $\Delta x^*$ is set to correspond to the deceleration speed required by the driver found from the input rod 6 and the stroke Xi. With this, the piston stroke Xb of the primary piston 2b is controlled so that the master-cylinder pressure (target master-cylinder pressure Ps*) is generated at a size that corresponds to the target degree of relative displacement $\Delta x^*$.

At this time, in the event that there is a change in the consumed fluid-amount fluid-pressure characteristic along with back-face supplement of brake fluid caused by pumping the brake, there is a change in the braking feeling that the driver can sense.

For that reason, the master-cylinder pressure (actual master-cylinder pressure PmcA) that is actually used is calculated at step S101 in the flowchart shown in FIG. 5.

Next, the process advances to step S102, and finds the amount of fluid consumed by braking (required amount of fluid consumed by braking Q1) required to implement the detected actual master-cylinder pressure PmcA based on the consumed fluid amount fluid-pressure reference characteristic.

Next, the process advances to step S103, and finds the amount of fluid consumed by braking (estimated amount of fluid consumed by braking Q$\alpha$) required to implement the target master-cylinder pressure Ps* based on the consumed-fluid amount fluid-pressure reference characteristic. Also, the amount of fluid consumed by braking change amount $|\Delta V|$ is calculated by subtracting the estimated amount of fluid consumed by braking Q$\alpha$ from the required amount of fluid consumed by braking Q1.

At this time, when the required amount of fluid consumed by braking Q1 becomes a value that is larger than the estimated amount of fluid consumed by braking Q$\alpha$, as shown in FIG. 6, the actual master-cylinder pressure PmcA that is actually occurring is a value that is larger than the target master-cylinder pressure Ps* (estimated master-cylinder pressure) found using the input rod stroke Xi. This indicates that the braking force on the input rod stroke Xi is higher than the reference. (See FIG. 7)

Figure 9:
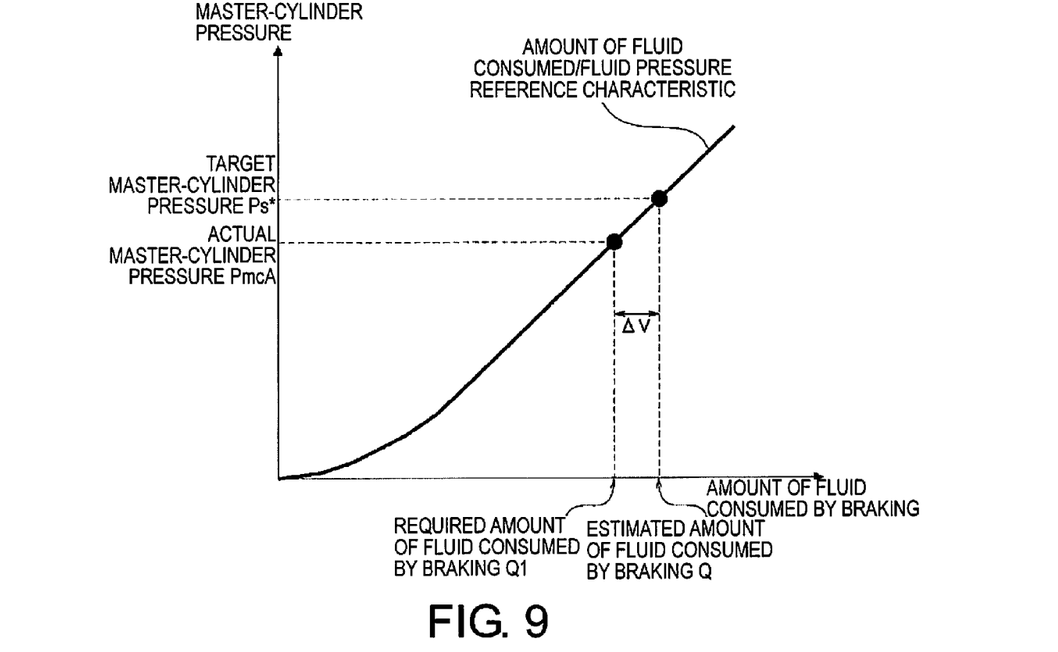
FIG. 9 is a relationship characteristic map of the amount of fluid consumed by braking and master-cylinder pressure, showing a corrective action of the target displacement amount, when the actual master-cylinder pressure is low.
Figure 10:
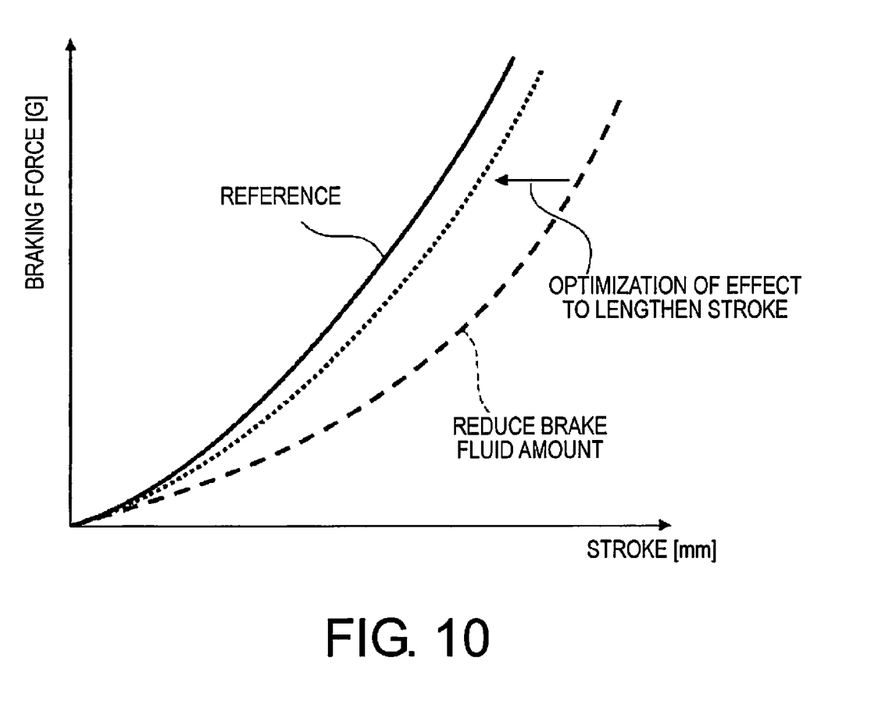
FIG. 10 is a map showing one example of a characteristic representing a relationship between a brake pedal stroke and braking force when the actual master-cylinder pressure is low.

Also, when the required amount of fluid consumed by braking Q1 becomes a value that is smaller than the estimated amount of fluid consumed by braking Q$\alpha$, as shown in FIG. 9, the actual master-cylinder pressure PmcA that is actually occurring is a value that is smaller than the target master-cylinder pressure Ps* (estimated master-cylinder pressure) found using the input rod stroke Xi. This indicates that the braking force on the input rod 6 stroke Xi is lower than the reference. (See FIG. 10)

Also, if the change amount $|\Delta V|$ of the amount of fluid consumed by braking is larger than the change amount threshold th, the process advances from step S103 to step S104 to calculate the correction amount of the target degree of relative displacement $\Delta x^*$ (target displacement-correction amount $\Delta x\delta$).

At this time, if the actually occurring master-cylinder pressure PmcA is at a value that is higher than the target master-cylinder pressure Ps* (the estimated master-cylinder pressure), the target displacement-correction amount $\Delta x\delta$ is set in a direction to reduce the target degree of relative displacement $\Delta x^*$. With this, even if braking fluid is supplemented because of the effect of a back-face supplement and the amount of fluid consumed by braking is higher than the operating amount of the brake pedal BP, it is possible to inhibit an increase in the increased amount of fluid consumed by braking by decreasing the target degree of relative displacement $\Delta x^*$. This results in inhibiting changes in braking and changes in the braking feeling, and inhibiting an unpleasant feeling sensed by the driver.

Also, if the actually occurring master-cylinder pressure PmcA is at a value that is smaller than the target master-cylinder pressure Ps* (the estimated master-cylinder pressure), the target displacement-correction amount $\Delta x\delta$ is set in a direction to increase the target degree of relative displacement $\Delta x^*$. With this, even if amount of fluid consumed by braking becomes smaller with regard to the operating amount of the brake pedal BP, such as when air is mixed into the brake fluid and the like, the amount of braking-consumed fluid can be increased by increasing the target degree of relative displacement $\Delta x^*$. This results in inhibiting changes in braking and changes in the braking feeling, and inhibiting an unpleasant feeling sensed by the driver.

Furthermore, when the target displacement-correction amount $\Delta x\delta$ is set, the relationship of the stroke with the braking force and the relationship of the depressing force and the braking force are optimally distributed by setting the target displacement-correction amount $\Delta x\delta$ to a value where the evaluation function J shown in equation (9) is a minimum, giving consideration to the relationships of the stroke amount (input rod stroke Xi) of the brake pedal BP, the depressing force (input rod thrusting force FIR) of the brake pedal, and the braking force (master-cylinder pressure Pmc).

Figure 7:
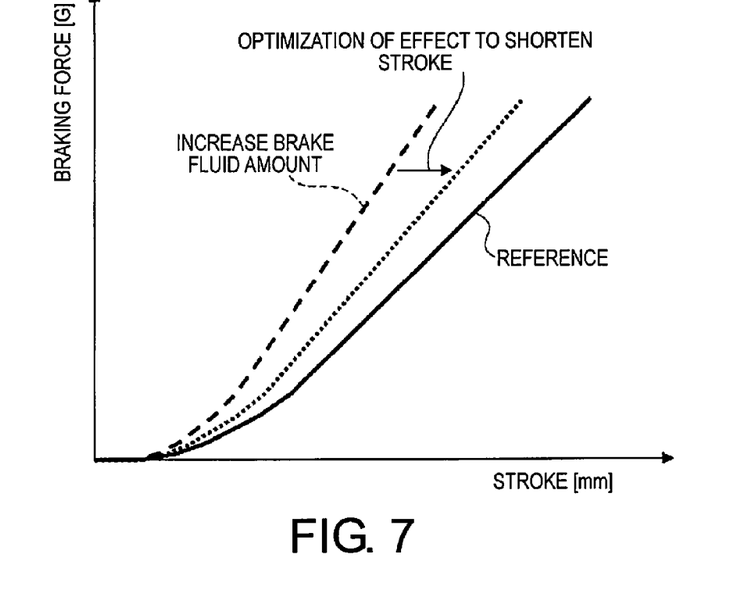
FIG. 7 is a map showing one example of a characteristic representing a relationship between a brake pedal stroke and braking force when the actual master-cylinder pressure is high.

In other words, as shown in FIG. 7, with the relationship between the stroke and the braking force, as the amount of fluid consumed by braking increases, the stroke amount of the brake pedal BP becomes shorter with regard to the braking force. For that reason, by correcting to reduce the amount of fluid consumed by braking, it is possible to restrain an effect that shortens the stroke.

Figure 8:
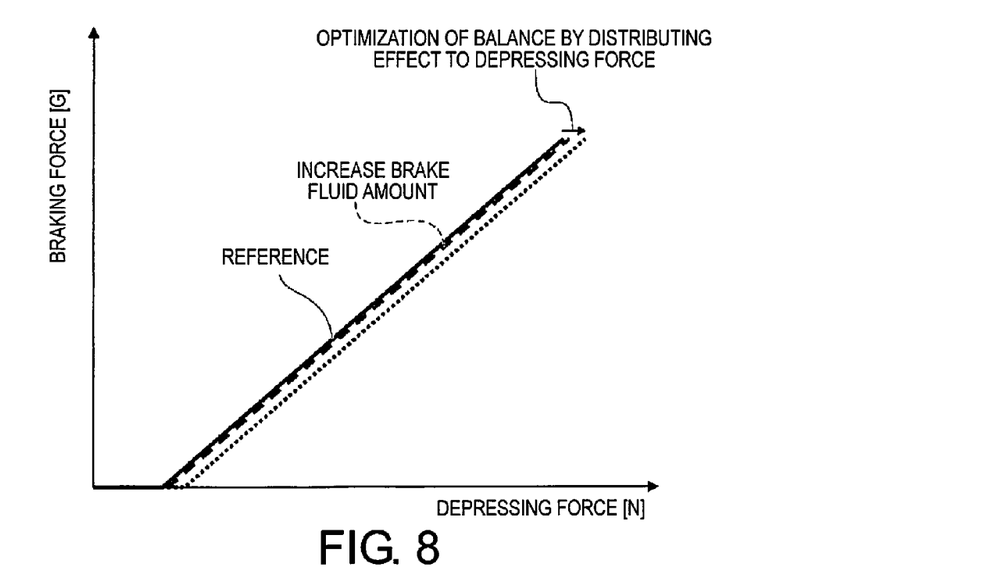

In response, as shown in FIG. 8, with the relationship between the depressing force and the braking force, as the amount of fluid consumed by braking increases, the depressing force on the brake pedal is reduced with regard to the braking force, when the amount of fluid consumed by braking is reduced, although there is little effect on the depressing force on the brake pedal with regard to the braking force. For that reason, when correcting to reduce the amount of fluid consumed by braking, it is necessary optimize a balance by distributing the effect that shortens the stroke to the depressing force.

In other words, when correcting the target degree of relative displacement $\Delta x^*$, it is possible optimally to distribute the effects when the target degree of relative displacement $\Delta x^*$ is corrected, to the stroke amount of the brake pedal BP, the force by which the brake pedal is depressed, and to the braking force by setting the target displacement-correction amount Oxo based on the stroke amount of the brake pedal BP and the force by which the brake pedal is depressed. This results in inhibiting the unpleasant sensation felt by the driver.

Also, when the required amount of fluid consumed by braking Q1 becomes a value that is smaller than the estimated amount of fluid consumed by braking Qα, as shown in FIG. 9, it is possible to correct to increase the amount of fluid consumed by braking by correcting to increase the target degree of relative displacement $\Delta x^*$. With this, it is possible to suppress an effect that lengthens the stroke.

Also, at that time, it is possible to optimize the balance by distributing the effect that lengthens the stroke by correcting to increase the amount of fluid consumed by braking.

Finally, when the target displacement-correction amount $\Delta x\delta$ is subtracted from the target degree of relative displacement $\Delta x^*$, and the corrected target degree of relative displacement $\Delta x^{}$ has been calculated, the piston stroke Xb of the primary piston $2b$ is controlled so that the master-cylinder pressure Pmc is generated at a size that corresponds to the corrected target degree of relative displacement $\Delta x^{}$.

In this way, with the vehicle braking control device in Embodiment 1, when the amount of fluid consumed by braking increases or decreases with regard to the reference, the amount of fluid consumed by braking change amount |ΔV| (an amount of increase or decrease) is estimated to correct the piston stroke Xb of the primary piston $2b$ based on this, so that the effect on the feeling of braking is distributed optimally. For that reason, even if the consumed fluid amount fluid pressure changes, it is possible to inhibit changes in the braking sensation that the driver feels.

The effects will now be described below.
The following effects are attained in the vehicle braking control device in Embodiment 1.

(1) In a vehicle braking control device equipped with: an input member (input rod) 6 that is moved forward and backward by operation of a brake pedal BP;

an assist member (primary piston) 2b disposed to be capable of moving in a relative manner with respect to a direction of movement of the input member 6;

an assist actuator (drive motor) 50 that moves the assist member forward and backward, and varies a degree of relative displacement $\Delta x$ of the input member 6 and the assist member 2b; and a control means (target relative displacement-amount correction unit) 80 that sets a target value (target degree of relative displacement $\Delta x^*$) of a degree of relative displacement $\Delta x$ of the input member 6 and the assist member 2b to control the assist actuator 50 so that the degree of relative displacement $\Delta x$ matches the target value $\Delta x^*$;

the vehicle braking control device generating an assisted hydraulic brake in a master cylinder 2 by an assist thrust FPP imparted to an assist member 2b in response to a movement of an input member 6; comprising a reference map (consumed fluid-amount fluid-pressure reference characteristic: FIG. 4) preset with a characteristic representing the relationship between the amount of fluid consumed by braking and a master cylinder pressure;

an amount-of-fluid-consumed-in-braking-estimating device (amount-of-fluid-consumed-in-braking-estimating means) 81 for calculating an estimated amount of fluid consumed by braking Qα which is the amount of fluid consumed in braking for implementing a braking force based on the brake pedal BP operating amount; and a master-cylinder pressure detection means (primary hydraulic sensor 13 and secondary hydraulic sensor 14) that detects an actual master-cylinder pressure PmcA; wherein the control means 80 corrects the target value $\Delta x^*$ in a direction to reduce the characteristics difference when the characteristic representing the relationship between the estimated amount of fluid consumed by braking Qα estimated by the amount-of-fluid-consumed-in-braking-estimating device 81, and the actual master-cylinder pressure PmcA detected by the master-cylinder pressure detection means 13, and 14 has a characteristics difference to the reference map (FIG. 4).

For that reason, even if the characteristic representing the relationship between the amount of fluid consumed by braking and the master-cylinder pressure changes because the brake is operated, it is possible to inhibit a change in braking and a brake feeling.

(2) The control means (target relative displacement-amount correction unit) 80 is constituted to include: a correction-amount-calculating means (correction-displacement amount calculating unit) 82 that calculates a correction amount (target displacement-correction amount) $\Delta x\delta$ of the target value $\Delta x^*$ based on the characteristics difference; and a target value correcting means (target relative displacement-computing unit) 83 for correcting the target value $\Delta x^*$ based on the corrected amount $\Delta x\delta$.

For that reason, it is possible more accurately to correct the target degree of relative displacement $\Delta x^*$ executed based on the corrected amount $\Delta x\delta$ calculated for the correction of the target value $\Delta x^*$.

(3) The control means (target relative displacement-amount correction unit) 80 is composed to correct in a direction to reduce the target value $\Delta x^*$, when the estimated master-cylinder pressure (target master-cylinder pressure Ps*) that is estimated based on the estimated amount of fluid consumed by braking Qα and the reference map (FIG. 4) is at a smaller value than the actual master-cylinder pressure PmcA.

For that reason, it is possible properly to correct the amount of fluid consumed by braking even when the amount of fluid consumed by braking is greater than the brake operation amount.

(4) The control means (target relative displacement-amount correction unit) 80 is composed to correct in a direction to increase the target value $\Delta x^*$, when the estimated master-cylinder pressure (target master-cylinder pressure Ps*) that is estimated based on the estimated amount of fluid consumed by braking Qα and the reference map (FIG. 4) is at a higher value than the actual master-cylinder pressure PmcA.

For that reason, it is possible properly to correct the amount of fluid consumed by braking even when the amount of fluid consumed by braking is lower with regard to the brake operation amount.

(5) The correction-amount-calculating means (correction-displacement amount calculating unit) 82 is composed to calculate the correction amount (target displacement-correction amount) $\Delta x\delta$ of the target value $\Delta x^*$ based on the brake pedal stroke BP and the force by which the brake pedal is depressed BP.

For that reason, when the amount of fluid consumed by braking changes with regard to the brake operation, it is possible optimally to distribute the effect of that change to the brake pedal stroke, pedal pressure and the braking force, thereby inhibiting an unpleasant sensation experienced by the driver.

(6) The control means (target relative displacement-amount correction unit) 80 is composed to learn and correct the reference map (FIG. 4) based on the characteristic representing the relationship between the estimated amount of fluid consumed by braking $Q\alpha$ and the master-cylinder pressure PmcA.

For that reason, it is possible more accurately to correct the target degree of relative displacement $\Delta x^*$ when the amount of fluid consumed by braking temporarily changes because of an update to the reference map.

Embodiment 2

Embodiment 2 is an example where the target displacement-correction amount $\Delta x\delta$ is variable in response to a speed at which the driver operates the brake pedal.

Figure 11:
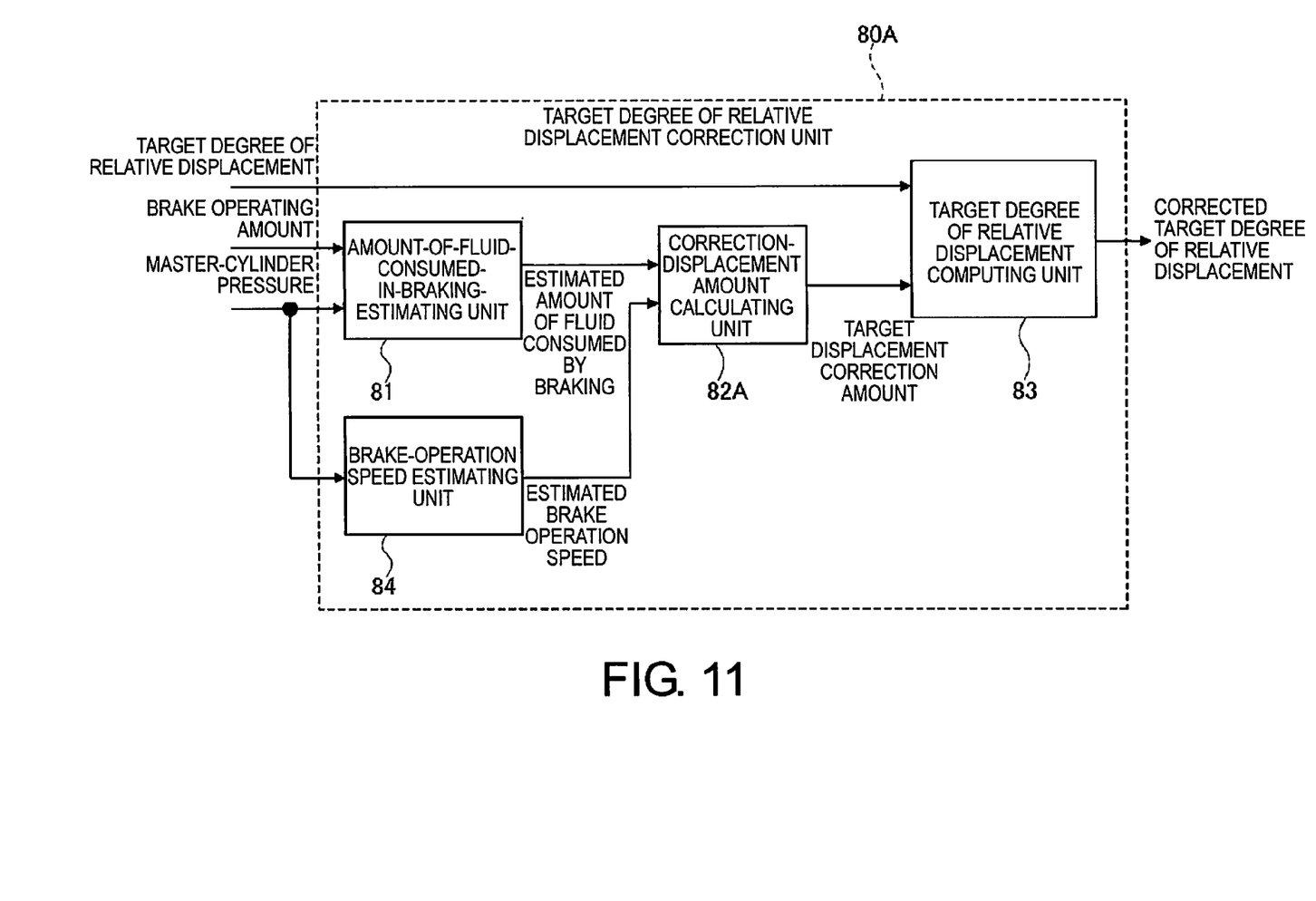
FIG. 11 is a configuration block diagram of a target degree of relative displacement correction unit in the vehicle braking control device of Embodiment 2.

FIG. 11 is a control block diagram of a target degree of relative displacement correction unit in the vehicle braking control device pursuant to Embodiment 2.

The vehicle braking control device pursuant to Embodiment 2 is equipped with a target relative displacement-amount correction unit 80A shown in FIG. 11. The target relative displacement-amount correction unit 80A is equipped with a brake consumed fluid amount estimating unit 81, a corrected displacement-amount calculating unit 82A, a target relative displacement-computing unit 83, and a brake-operation speed estimating unit 84.

The brake consumed fluid amount estimating unit 81 calculates the estimated amount of fluid consumed by braking $Q\alpha$ using the same procedures as those described in Embodiment 1. For that reason, a detailed description will be omitted. Also, the target relative displacement-computing unit 83 calculates the target degree of relative displacement $\Delta x^{**}$ after correction using the same procedures as those described in Embodiment 1. For that reason, a detailed description will be omitted.

The brake-operation speed estimating unit 84 estimates the pedal operation speed based on the operating amount (required deceleration speed) of the brake pedal BP detected by the brake-operation amount detection unit 7. Here, estimation of the pedal operating speed is executed by a pseudo-differential operation that uses a high-pass filter, for example.

The corrected displacement-amount calculating unit 82A includes a consumed fluid-amount fluid pressure reference characteristic preset for each operating speed of the brake pedal BP. Also, this switches the consumed fluid-amount fluid pressure reference characteristic that is applied when calculating the required amount of fluid consumed by braking Q1 in response to the estimated pedal operating speed estimated by the brake-operation speed estimating unit 84. Thereafter, the target displacement-correction amount $\Delta x\delta$ is calculated using the same procedure as in Embodiment 1.

With this, the target displacement-correction amount $\Delta x\delta$ varies in response to the magnitude of the estimated pedal operating speed. For that reason, it is possible to calculate the target displacement-correction amount $\Delta x\delta$ by considering an effect of the change in transitional master-cylinder pressure, when the brake pedal operating speed is fast and the master-cylinder pressure is transitionally high, more accurately to correct the target degree of relative displacement $\Delta x^*$. This results in inhibiting changes in braking and changes in the braking feeling, and inhibiting an unpleasant feeling sensed by the driver.

Also, if the estimated pedal operating speed estimated by the brake-operation speed estimating unit 84 exceeds a preset threshold, it is acceptable to set the correction amount of the degree of relative displacement $\Delta x$ to a comparatively high value, compared to when the estimated pedal operating speed is below the threshold.

With this, when it can be judged that the estimated pedal operating speed is fast, and the driver's deceleration request is strong, it is possible comparatively to expand a correction amount of the degree of relative displacement $\Delta x$ and to deploy braking force earlier.

In other words, with the vehicle braking control device in Embodiment 2, the following effects are attained.

(7) The correction-amount-calculating means (corrected displacement-amount calculating unit) 82A is composed to increase or to decrease the correction amount $\Delta x\delta$ in response to the operating speed (estimated pedal operating speed) of the brake pedal BP.

For that reason, it is possible to correct the target displacement-correction amount $\Delta x\delta$ by considering an effect of the change in a transitional master-cylinder pressure that fluctuates in response the operating speed of the brake pedal by the driver, more accurately to correct the target degree of relative displacement $\Delta x^*$.

The invention claimed is:

1. A vehicle braking control device, comprising:
a brake pedal configured to be operated;
an input member configured to be moved forward and backward by the operation of the brake pedal;
an assist member configured to be moved with respect to a direction of movement of the input member;
a force-multiplying actuator configured to move the assist member forward and backward, and to vary the degree of relative displacement between the input member and the assist member; and
a control unit programmed to set, on the basis of an amount the brake pedal is operated, a target value of the degree of relative displacement between the input member and the assist member, and to control the force-multiplying actuator so that the degree of relative displacement matches the target value,
the input member, in response to being moved, generating a force-multiplied hydraulic brake pressure in a master cylinder by an assist thrust imparted to the assist member
a reference map preset with a characteristic representing the relationship between an amount of fluid consumed by braking and a master cylinder pressure;
an amount-of-fluid-consumed-in-braking-estimating device configured to calculate an estimated amount of fluid consumed by braking, which is the amount of fluid consumed in braking for implementing a braking force based on the amount the brake pedal is operated; and
a master-cylinder pressure-detection device configured to detect an actual master-cylinder pressure,
the control unit, when a characteristic representing the relationship between the estimated amount of fluid consumed by braking and the actual master-cylinder pressure has a difference with regard to the characteristic preset in the reference map, being programmed to correct the target value of the degree of relative displacement between the input member and the assist member in a direction in which the difference between the characteristic representing the relationship between the estimated amount of fluid consumed by braking and the actual master-cylinder pressure and the characteristic preset in the reference map is reduced.

2. The vehicle braking control device according to claim 1, wherein the control unit includes a correction-amount-calculating unit configured to calculate an amount of correction of the target value of the degree of relative displacement between the input member and the assist member, based on the difference between the characteristic representing the relationship between the estimated amount of fluid consumed by braking and the actual master-cylinder pressure and the characteristic preset in the reference man, and a target value correction unit configured to correct a target value of the degree of relative displacement between the input member and the assist member, based on the amount of correction.

3. The vehicle braking control device according to claim 1, wherein the control unit is configured to implement, when an estimated master-cylinder pressure estimated based on the estimated amount of fluid consumed by braking and the reference map is lower than the actual master-cylinder pressure, a correction in a direction in which the target value of the degree of relative displacement between the input member and the assist member is reduced.

4. The vehicle braking control device according to claim 1, wherein the control unit is configured to implement, when an estimated master-cylinder pressure estimated based on the estimated amount of fluid consumed by braking and the reference map is higher than the actual master-cylinder pressure, a correction in a direction in which the target value of the degree of relative displacement between the input member and the assist member is increased.

5. The vehicle braking control device according to claim 2, wherein the correction-amount-calculating unit is configured to calculate the amount of correction based on a stroke of the brake pedal and a force by which the brake pedal is depressed.

6. The vehicle braking control device according to claim 1, wherein the control unit is programmed to learn and correct the reference map based on the characteristic representing the relationship between the amount of fluid consumed by braking and the master-cylinder pressure as found using the amount of displacement between the input member and the assist member.

7. The vehicle braking control device according to claim 2, wherein the correction-amount-calculating unit is configured to increase or decrease the amount of correction of the target value of the degree of relative displacement between the input member and the assist member, in response to a speed at which the brake pedal is operated.

8. The vehicle braking control device according to claim 2, wherein the control unit is configured to implement, when an estimated master-cylinder pressure estimated based on the estimated amount of fluid consumed by braking and the reference map is lower than the actual master-cylinder pressure, a correction in a direction in which the target value of the degree of relative displacement between the input member and the assist member is reduced.

9. The vehicle braking control device according to claim 2, wherein the control unit is configured to implement, when an estimated master-cylinder pressure estimated based on the estimated amount of fluid consumed by braking and the reference map is higher than the actual master-cylinder pressure, a correction in a direction in which the target value of the degree of relative displacement between the input member and the assist member is increased.

10. The vehicle braking control device according to claim 3, wherein the control unit is configured to implement, when an estimated master-cylinder pressure estimated based on the estimated amount of fluid consumed by braking and the reference map is higher than the actual master-cylinder pressure, a correction in a direction in which the target value of the degree of relative displacement between the input member and the assist member is increased.

11. The vehicle braking control device according to claim 2, wherein the control unit is programmed to learn and correct the reference map based on the characteristic representing the relationship between the amount of fluid consumed by braking and the master-cylinder pressure as found using the amount of displacement between the input member and the assist member.

12. The vehicle braking control device according to claim 3, wherein the control unit is programmed to learn and correct the reference map based on the characteristic representing the relationship between the amount of fluid consumed by braking and the master-cylinder pressure as found using the amount of displacement between the input member and the assist member.

13. The vehicle braking control device according to claim 4, wherein the control unit is programmed to learn and correct the reference map based on the characteristic representing the relationship between the amount of fluid consumed by braking and the master-cylinder pressure as found using the amount of displacement between the input member and the assist member.

14. The vehicle braking control device according to claim 5, wherein the control unit is programmed to learn and correct the reference map based on the characteristic representing the relationship between the amount of fluid consumed by braking and the master-cylinder pressure as found using the amount of displacement between the input member and the assist member.

* * * * *